(12) United States Patent (10) Patent No.: US 9,150,061 B2
Riehle et al. (45) Date of Patent: Oct. 6, 2015

(54) CARRIER DEVICE

(75) Inventors: Joerg Riehle, Asperg (DE); Wolfgang Gentner, Steinheim (DE); Bert Wegner, Gingen (DE); Romeo Wieczorek, Esslingen (DE)

(73) Assignee: Scambia Holdings Cyprus Limited, Limassol (CY)

( * ) Notice: Subject to any disclaimer, the term of this patent is extended or adjusted under 35 U.S.C. 154(b) by 730 days.

(21) Appl. No.: 13/295,598

(22) Filed: Nov. 14, 2011

(65) Prior Publication Data

US 2012/0130589 A1 May 24, 2012

(51) Int. Cl.
*B60D 1/24* (2006.01)
*B60D 1/01* (2006.01)
*B60D 1/58* (2006.01)

(52) U.S. Cl.
CPC *B60D 1/01* (2013.01); *B60D 1/248* (2013.01); *B60D 1/58* (2013.01)

(58) Field of Classification Search
CPC ....... B60D 1/00; B60D 1/248; B60D 2001/00
USPC .............. 701/36; 280/446.1, 449, 455.1, 400, 280/493, 495, 511; 73/862.621, 862.625
See application file for complete search history.

(56) References Cited

U.S. PATENT DOCUMENTS

| | | | |
|---|---|---|---|
| 4,319,766 A | 3/1982 | Corteg et al. | |
| 4,576,053 A * | 3/1986 | Hatamura | 73/862.629 |
| 4,756,374 A * | 7/1988 | Bailey et al. | 177/137 |
| 4,793,193 A * | 12/1988 | Borgudd | 73/862.043 |
| 5,149,121 A * | 9/1992 | Hafner | 280/432 |
| 5,853,186 A | 12/1998 | Gentner et al. | |
| 6,053,521 A * | 4/2000 | Schertler | 280/511 |
| 6,705,684 B1 * | 3/2004 | Garvey | 303/123 |
| 7,438,368 B2 * | 10/2008 | Kohler et al. | 303/123 |
| 2002/0020988 A1 | 2/2002 | Kleb et al. | |
| 2003/0160428 A1 * | 8/2003 | Lindell et al. | 280/432 |
| 2003/0236604 A1 * | 12/2003 | Lu et al. | 701/45 |
| 2010/0076673 A1 | 3/2010 | Saloka | |
| 2010/0332049 A1 * | 12/2010 | Sy et al. | 701/1 |

FOREIGN PATENT DOCUMENTS

| | | |
|---|---|---|
| AU | 2008264181 A1 | 7/2009 |
| DE | 3834883 A1 | 4/1990 |
| DE | 3923198 A1 | 1/1991 |
| DE | 4328147 A1 | 2/1995 |
| DE | 10154733 A1 | 5/2003 |

(Continued)

OTHER PUBLICATIONS

National Instruments, "Strain Gauge Measurement—A Tutorial," Application Note 078, Aug. 1998.*

*Primary Examiner* — Spencer Patton
(74) *Attorney, Agent, or Firm* — Reinhart Boerner Van Deuren P.C.

(57) ABSTRACT

In order to improve a carrier device for motor vehicles which is designed to support loads such that the loads acting on it can be detected, it is suggested that the carrier device be provided at the least with a first sensor at a first installation point and with a second sensor at a second installation point, that a section of the carrier device be located between the installation points, its deformations caused by a load being detected by the sensors at least in part and that an evaluation unit be provided which records measurement values of the sensors and determines a borne load from them.

27 Claims, 14 Drawing Sheets

(56) References Cited

FOREIGN PATENT DOCUMENTS

| | | |
|---|---|---|
| DE | 10 2006 030001 A1 | 1/2008 |
| DE | 20 2008 015740 U1 | 4/2009 |
| DE | 10 2007 062252 A1 | 6/2009 |
| EP | 0799732 A1 | 10/1997 |
| EP | 1142732 A2 | 10/2001 |
| EP | 1199547 A2 | 4/2002 |
| EP | 1612081 A1 | 1/2006 |

* cited by examiner

CARRIER DEVICE

This patent application claims the benefit of German application No. 10 2010 043 964.9, filed Nov. 16, 2010, the teachings and disclosure of which are hereby incorporated in their entirety by reference thereto.

The invention relates to a carrier device for motor vehicles which is designed to support loads.

The problem with such carrier devices is to detect the loads supported on them in order to be able to indicate to, for example, a driver whether the loads are too great or too small (i.e., negative) or are still within a tolerable range.

The object underlying the invention is, therefore, to improve a carrier device for motor vehicles of the type described at the outset in such a manner that the loads acting on them can be detected.

This object is accomplished in accordance with the invention, in a carrier device of the type described at the outset, in that the carrier device is provided at the least with a first sensor at a first installation point and with a second sensor at a second installation point, that a section of the carrier device is located between the installation points, the deformations of this section caused by a load being detected by the sensors at least in part and that an evaluation unit is provided which records measurement values of the sensors and determines a borne load from them.

The advantage of the solution according to the invention is to be seen in the fact, with it, a simple possibility has been created of detecting the borne load without great resources with respect to the apparatus being needed.

In order to be able to use the section of the carrier device between the first installation point and the second installation point reliably for determining the borne load, it is preferably provided for the section of the carrier device to be a one-piece section.

Another advantageous solution provides for the section of the carrier device to comprise parts connected to one another by clearance-free connections.

Such parts connected in a clearance-free manner can be parts connected to one another, for example, by way of form locking or force locking, wherein the connection must be configured in a clearance-free manner.

This means that none of the parts of the carrier device are suitable which are connected to one another by way of a releasable or a movable connection, even when this releasable or the movable connection can be fixed in place by a fixing device since such a fixing device always has a slight degree of clearance which, in particular, cannot be defined over a long period of time.

It is particularly advantageous when the clearance-free connections are materially joined connections.

Such materially joined connections are, for example, adhesive connections, solder or weld connections.

In order to be able to detect the deformations caused by a load in a directionally selective manner, it is preferably provided for the deformations caused by a load to be detected with respect to planes of detection of the sensors which are essentially parallel to one another.

Due to the fact that essentially parallel planes of detection are used, it is ensured that movements caused by a load which result only in these planes will be detected as a result of the deformations caused by a load and so the deformations caused by a load may be evaluated in a directionally selective manner.

Essentially parallel planes of detection are to be understood as planes of detection which either extend parallel to one another or form with one another an angle of at the most plus/minus 10° since such slight angles between the planes of detection have a very slight effect on the results.

The planes of detection could, in theory, be selected arbitrarily.

It is, however, particularly advantageous when the planes of detection extend essentially parallel to measurement directions of the sensors which are predetermined by a construction of the sensors, in particular essentially parallel to planes defined by two respective directions of measurement of the sensors.

In this case, as well, the essentially parallel course of the plane of detection relative to the respective plane defined by the directions of measurement is to be understood either as a parallel course or as a course at an angle of at the most plus/minus 10°.

In addition, it is preferably provided for the projection of the directions of measurement of one of the sensors located in the one plane of detection onto the other plane of detection of the other one of the sensors to likewise result in an essentially parallel course of the directions of measurement relative to one another, i.e. the directions of measurement in the respective plane also form with one another an angle of at the most plus/minus 10° or extend parallel to one another.

With respect to the evaluation of the measurement values in the evaluation unit, no further details have so far been given.

The most varied of solutions are conceivable.

For example, it is conceivable to specify value tables for the measurement values of the first and the second sensors, from which the borne load may be determined at the various measurement values of the sensors.

One particularly simple type of evaluation provides, however, for the evaluation unit to determine differential values from the measurement values for the purpose of determining the borne load.

In one very simply type of evaluation, it is provided, in particular, for the evaluation unit to compare load-free differential values with differential values caused by a load for the purpose of evaluation.

Such a comparison could also be brought about by way of comparison of the differential values caused by a load with load-free differential values which are recorded in value tables.

One particularly favorable solution provides, however, for the evaluation unit to determine a measurement for the borne load from the deviation of the differential values caused by a load from a load-free differential value.

With respect to the design of the sensors, the most varied of solutions are conceivable.

For example, the sensors could be designed such that they detect movement relative to one another.

One particularly simple and inexpensive solution provides, however, for the first and the second sensors to be tilt sensors.

Such tilt sensors could be constructed and designed as special tilt sensors.

One particularly advantageous solution provides, however, for the first sensor and the second sensor to be acceleration sensors which can be operated as tilt sensors.

Such acceleration sensors which may also be operated as tilt sensors have the great advantage that they create the possibility of not only detecting tilting but also of allowing the detection of accelerations at the same time or offset in time.

Sensors which work as tilt sensors are preferably designed such that they detect tilting about at least one axis of inclination.

It is particularly favorable when the sensors detect tilt values with respect to a direction of gravity as reference so that it is possible to detect the tilting in different directions relative to the direction of gravity.

With the solution according to the invention, it is provided in this case, in particular, for the deformations caused by a load to be recorded by way of tilt differential values which are formed from tilt values of the sensors recorded as measurement values.

In this case, the deviation of the tilt differential values of the sensors caused by a bearing load from a tilt differential value free from a bearing load may, in particular, be determined.

For example, the sensors are aligned such that a tilt value about axes of inclination extending essentially parallel to one another can be detected with the first sensor and the second sensor.

It is particularly advantageous when the axes of inclination extend essentially at right angles to a longitudinal central plane of the vehicle.

A longitudinal central plane of the vehicle is to be understood as a plane which extends through the center of the vehicle and in a longitudinal direction as well as vertically.

Furthermore, an essentially right-angled course of the axes of inclination in relation to the longitudinal central plane of the vehicle is to be understood such that the axes of inclination form an angle of at least 80° with the longitudinal central plane of the vehicle.

The axes of inclination, about which tilting can be determined, preferably extend at right angles to tilt detection planes which are defined by at least two axes of measurement of the sensors, wherein the sensors are preferably aligned such that the respective tilt detection planes thereof form with one another an angle of at the most plus/minus 10°, are preferably aligned parallel to one another.

No details have been given in conjunction with the preceding explanations concerning the individual embodiments as to how the evaluation unit is intended to determine the tilt differential value free from a bearing load.

In this respect, it is preferably provided for the evaluation unit to determine the load-free tilt differential value within the scope of a reference measurement.

A reference measurement can be initiated manually, for example, by actuating a key.

Such a reference measurement can be initiated by certain operating states of the motor vehicle, for example bringing the trailer coupling into its operating position, i.e., for example, mounting in the operating position or moving from a rest position into the operating position, or in the case of an available trailer recognition, also by any unlocking thereof and/or starting the engine when the trailer recognition does not recognize any trailer.

Furthermore, it is preferably provided for the evaluation unit to determine the tilt differential value caused by a load when the motor vehicle is not moving so that the dynamic characteristics of the vehicle cannot have any effect on the tilt differential value caused by a bearing load.

A vehicle which is not moving is to be understood as a stationary vehicle and/or a vehicle which is moving at less than 5 km/h.

In order to make it possible for the evaluation unit to also be able to evaluate the value for the load, it is preferably provided for the evaluation unit to evaluate the admissibility of the load by way of comparison with a reference value which is predetermined in the evaluation unit and, for example, is stored in it in order to transmit the admissibility to other units by way of one or more signals.

For example, the evaluation unit is coupled to a display unit which displays the admissibility or non-admissibility of the load, for example, by way of colored light signals or a display bar with a controllable, variable coloring.

In addition, the solution according to the invention also, however, creates the possibility of the evaluation unit recording accelerations with at least one of the sensors.

It is even more advantageous when the evaluation unit records accelerations with both sensors.

The detection of accelerations with the first and second sensors offers the possibility of also detecting dynamic forces, i.e. forces occurring during operation of the vehicle.

In this respect, it is possible with the solution according to the invention, for example, for the evaluation unit to record accelerations transverse to a longitudinal central plane of the vehicle.

It is, however, also possible to record accelerations in the longitudinal central plane of the vehicle; these can be accelerations acting in a horizontal direction or accelerations acting in a vertical direction.

The measurements of accelerations can be carried out with the two sensors as direct measurements of accelerations.

Alternatively, it is, however, also favorable for the purpose of excluding drift effects when the measurements of accelerations are carried out as differential measurements.

It is possible with such measurements of accelerations to pass information on the accelerations acting on the carrier device to the units of the motor vehicle which influence the vehicle dynamics in order to take them into consideration during the control of these units for improving the vehicle dynamics.

In conjunction with the preceding explanations of the individual embodiments no further details have been given as to how the carrier device itself is intended to be designed.

It is, for example, possible to provide a roof load carrier as carrier device.

Another embodiment provides for the carrier device to comprise a body connection support arranged on the body at the rear end and a bearing load receiving element held by the body connection support.

Such a body connection support can, for example, be a cross member with side members which can be mounted on the rear end of the vehicle body, wherein the cross member is covered, for example, by a bumper and the side members extend in a lower region of the body and are connected to it.

The bearing load receiving element can likewise be designed in the most varied of ways.

For example, the bearing load receiving element is designed as a ball neck with a coupling device, for example with a coupling ball, to which a trailer can be attached in order to pull this trailer with the motor vehicle.

Another advantageous solution provides for the bearing load receiving element to be designed, for example, as a rear load carrier which serves the purpose of transporting additional loads with the motor vehicle at the rear end.

Such a rear load carrier can, for example, be a rear luggage rack or a rear unit carrier or also a rear bicycle rack.

With respect to the arrangement of the installation points for the first and the second sensors no further details have been given with respect to the design of the carrier device from a body connection support and a bearing load receiving element.

One advantageous solution provides for the first and the second installation points to be arranged on the body connection support.

Alternatively or in addition hereto, it is provided for the first and the second installation points to be arranged on the bearing load receiving element.

In this respect, it is not provided, in particular, for the first installation point to be provided on the body connection support and the second installation point on the bearing load receiving element when they are intended to be releasably or movably connected to one another since clearance which is not defined can occur between the two as a result of this connection and this would falsify the measurements.

Additional features and advantages of the invention are the subject matter of the following description as well as the drawings illustrating several embodiments.

IN THE DRAWINGS

Figure 1:
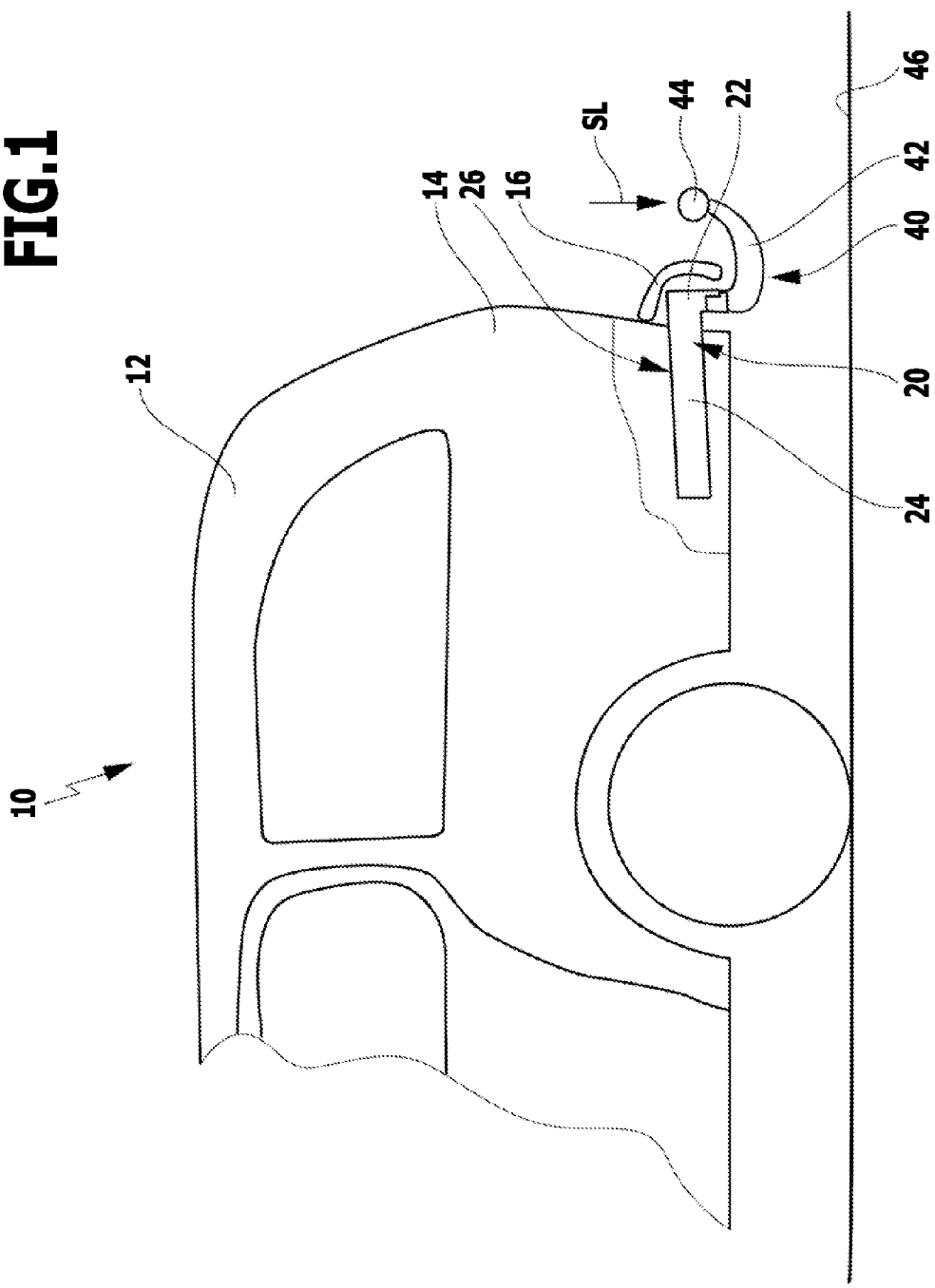
FIG. 1 shows a partially broken away side view of a rear region of a motor vehicle with a first embodiment of a carrier device according to the invention, designed as a trailer coupling.

A motor vehicle designated as a whole as 10 in FIG. 1 comprises a vehicle body 12, on which a carrier device 20 according to the invention is mounted in a rear area 14, this carrier device having a cross member 22 covered by a bumper unit 16 as well as side members 24 which extend in longitudinal direction of the body along body wall sections, are fixed in place on them and together with the cross member form a body connection support 26 which is covered partially by the vehicle body 12 and partially by the bumper unit 16.

Figure 3:
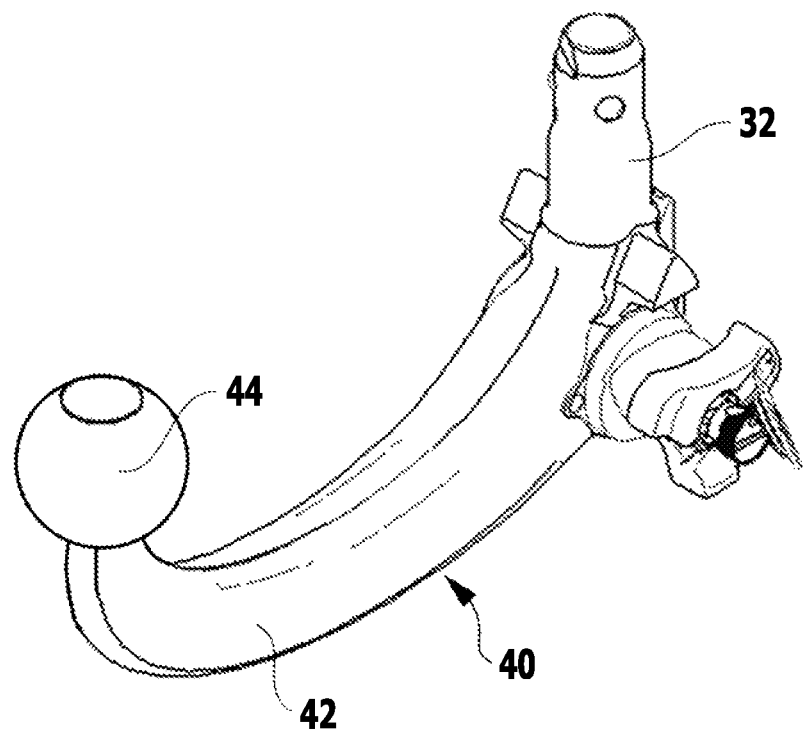
FIG. 3 shows an enlarged illustration of the bearing load receiving element in the first embodiment of the trailer coupling according to the invention.

The body connection support 26 is provided with a receiving member, which is designated as a whole as 30, for a holding element 32, which is illustrated on an enlarged scale in FIG. 3, of a bearing load receiving element which is designated as a whole as 40 and, in this case, is designed as a ball neck 42 which, on the one hand, bears the holding element 32 and, on the other hand, is provided with a coupling ball 44.

In the case of the ball neck 42 as bearing load receiving element 40, the following forces at least act on the coupling ball 44 which serves the purpose of the connection to a vehicle trailer or for supporting a rear load carrier.

In the static case, i.e. when the vehicle is stationary, a force SL acts on the coupling ball 44 which corresponds to the bearing load, is preferably directed in a vertical direction transverse to a roadway 46 and can act on the coupling ball 44 in the direction of gravity or contrary to the direction of gravity.

The bearing load represents a measure for how strongly a trailer presses on the coupling ball 44 or how heavy a rear load carrier of the motor vehicle is which engages on the coupling ball 44.

In addition, during operation of the motor vehicle a vertical force Vo which is located in a longitudinal central plane FL of the vehicle acts from above and/or a vertical force Vu which is located in the longitudinal central plane FL of the vehicle from below, depending on the dynamic driving state of the motor vehicle 10 and a trailer attached to it or a rear load carrier mounted on it.

At the same time, a transverse force Ql, which acts on the coupling ball 44 essentially horizontally, acts on the coupling ball 44 from the left and/or a transverse force Qr directed, where applicable, contrary thereto from the right, wherein these transverse forces Ql and Qr are preferably at right angles to the longitudinal central plane FL of the vehicle.

Furthermore, a longitudinal force Lv, which is aligned horizontally, acts on the coupling ball 44 from the front and/or a longitudinal force Lr, which is aligned horizontally, from the rear, wherein the longitudinal forces Lv and Lr are located in the longitudinal central plane FL of the vehicle in the same way as the vertical force from above Vo and the vertical force from below Vu.

The object according to the invention, namely to configure the traveling modes of the motor vehicle 10 in a safer manner and, where applicable, prevent unsafe traveling modes, is accomplished with the carrier device 20 according to the invention in that one or more of the forces SL, Ql, Qr, Vo, Vu, Lv and Lr will be recorded by an evaluation unit 50 provided on the vehicle and evaluated, for example, with the aid of threshold values.

Figure 4:
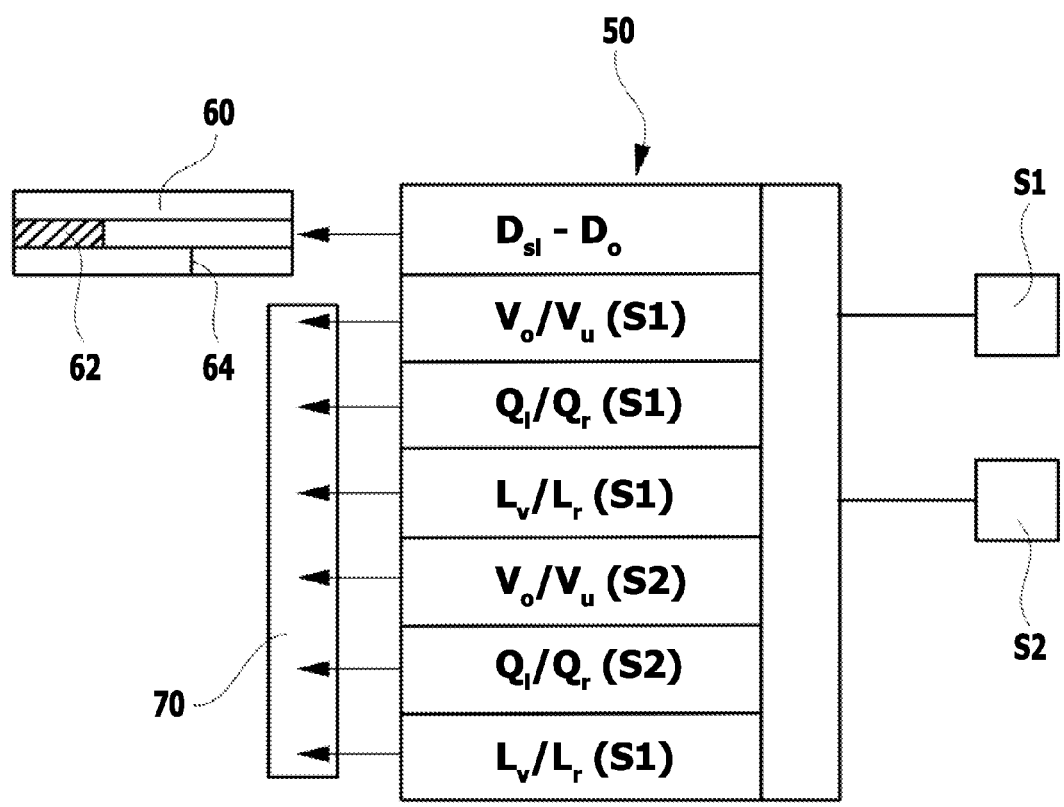
FIG. 4 shows a block diagram of an evaluation unit of the first embodiment of the carrier device according to the invention.

The evaluation unit 50 then determines, for its part, during the course of the evaluation whether information signals for the operator of the motor vehicle or for a traveling mode control of the motor vehicle will be transmitted (FIG. 4).

Figure 2:
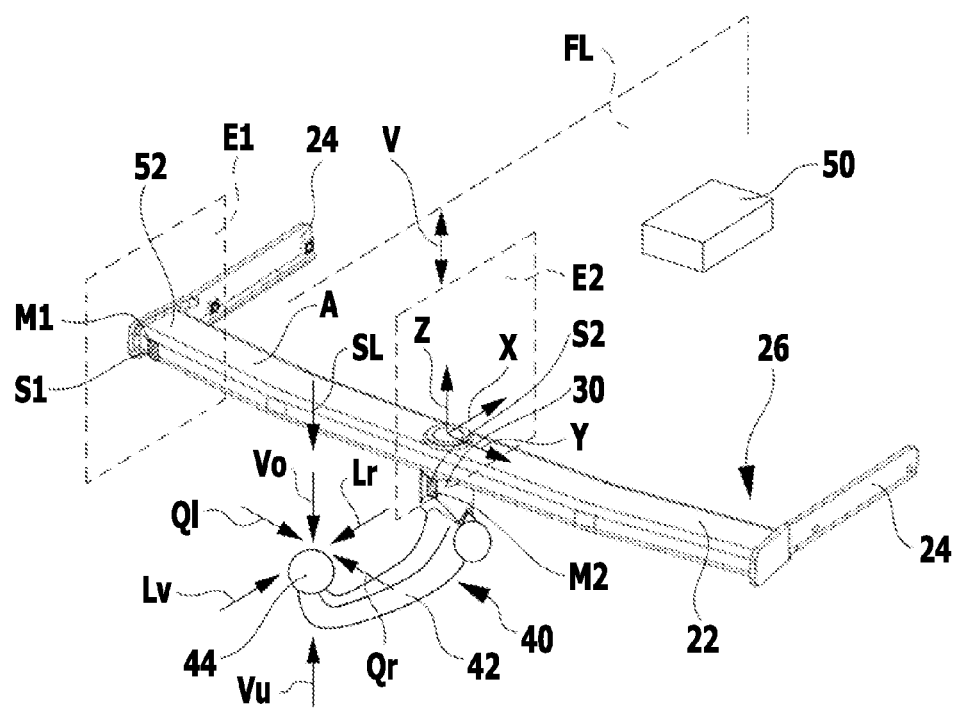
FIG. 2 shows a perspective illustration of a first embodiment of a carrier device according to the invention.

The recording of the forces specified above by the evaluation unit 50 is brought about, as illustrated, for example, in FIG. 2, by two sensors S1 and S2 which are arranged on the carrier device 20 according to the invention at installation points M1 and M2, respectively, at a distance from one another.

For example, in the case of the embodiment illustrated in FIG. 2, the sensor S1 is arranged at the installation point M1 on the cross member 22 at an outer end 52 connected to the respective longitudinal member 24 and the sensor S2 is arranged at the installation point M2 on the receiving member 30.

Figure 5:
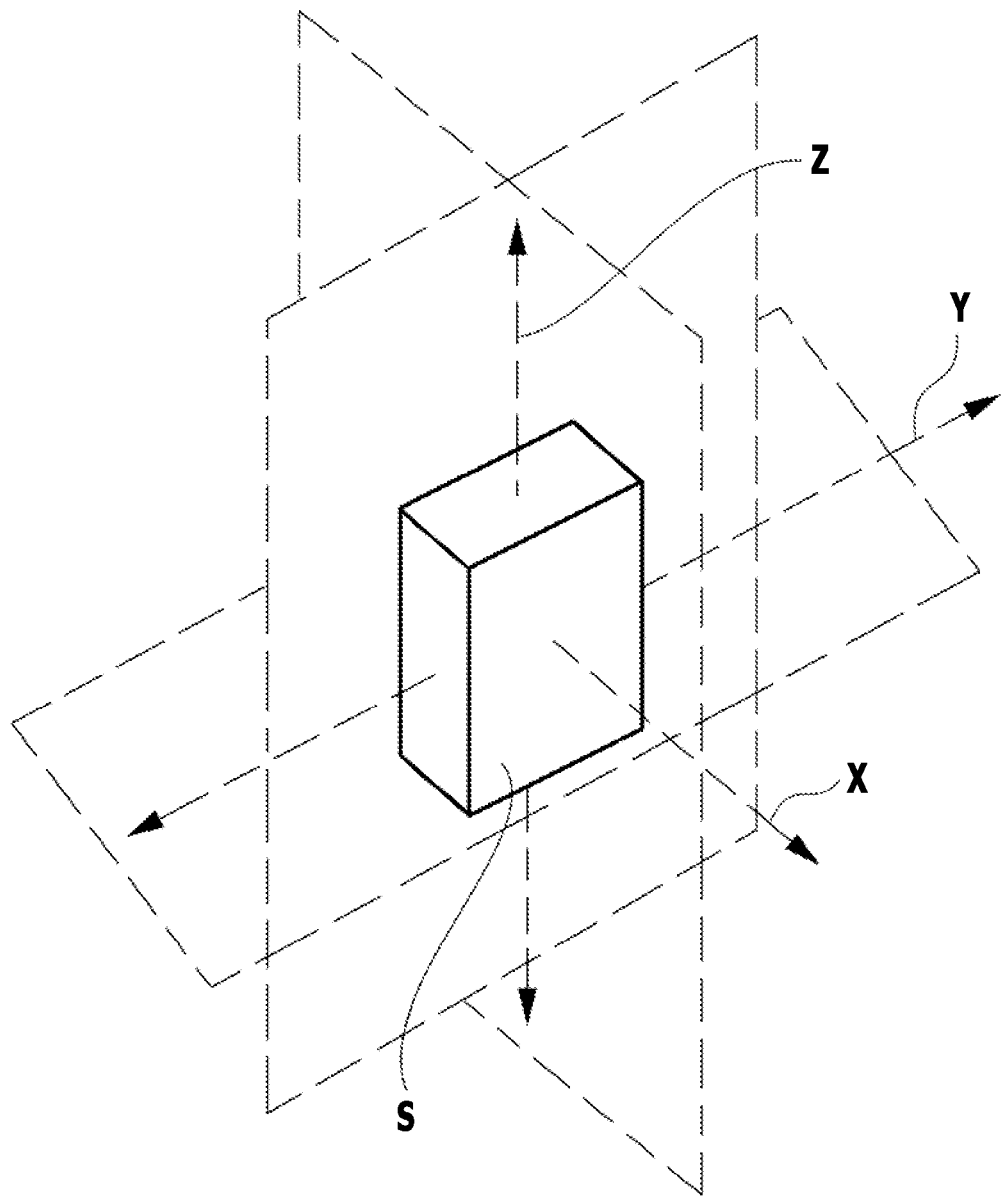
FIG. 5 shows a schematic illustration of a sensor with the directions of measurement to be used with the first embodiment.

Each of the sensors S1 and S2 is a micro-electromechanical system which is constructed in MEMS technology and can be used, for example, not only as an acceleration sensor but also as a tilt sensor. As illustrated in FIG. 5, such a sensor S is designed as an approximately parallelepiped block and is able to measure accelerations in one spatial direction and/or in two spatial directions and/or in three spatial directions, for example the spatial directions X, Y and Z, and, in addition, is able to detect tilting about the Y axis as axis of rotation in the XZ plane and tilting about the X axis as axis of rotation in the YZ plane when it is assumed that the Z axis forms the smallest angle with a vertical line V, i.e. extends approximately parallel to it.

In the first embodiment, illustrated in FIG. 2, the sensors S1 and S2 are arranged such that they detect tilting about the Y axis as axis of inclination at least in the tilt detection planes E1 and E2, which are, for example, the XZ planes according to FIG. 5, wherein the planes E1 and E2 preferably extend parallel to one another, at the most at an angle of +/−10°. In the first embodiment, the planes E1 and E2 are aligned such that the respective Y axes extend transversely to the longitudinal central plane FL of the vehicle, preferably essentially at right angles to the longitudinal central plane FL of the vehicle, wherein an essentially right-angled course is to be understood such that the smallest angle between the respective Y axis and the longitudinal central plane FL of the vehicle is greater than 80°.

It is, however, also conceivable for the planes E1 and E2 to extend at an angle in the range of between, for example, 20° and 60°, wherein the alignment of the planes E1 and E2 is expediently dependent on the course of the deformation of the section A, namely such that the deformation in the planes E1 and E2 leads to a greatest possible difference in tilt when the force SL occurs.

Furthermore, the sensors S1 and S2 are aligned relative to one another with their X axes and Z axes which are located in the respective tilt detection planes E1 and E2 such that a projection of the X and the Z axes of the one sensor S1, S2 onto the plane E2, E1 of the respectively other sensor S2, S1 results in an angle between the X and Z axes, respectively, of less than 10°, wherein the respective projections of the X axes and Z axes in the respective tilt detection planes E2, E1 preferably extend parallel to the X axes and Z axes located in these tilt detection planes E2, E1.

The tilting relative to the Z axis may be detected with a one-axis acceleration sensor, the one axis of measurement of which extends parallel to the tilt detection planes E1, E2.

If the coupling ball 44 is loaded with a force SL corresponding to the bearing load, this force SL will be transferred by the bearing load receiving element 40 to the body connection support 26, wherein this force SL leads to deformations in the body connection support 26 caused by the bearing load on account of the material elasticities, in particular to a torsion-like deformation with respect to the Y axis of the section A between the installation point M1 of the sensor S1 and the installation point M2 of the sensor S2, wherein the section A is formed by the respective section of the cross member 22 and part of the receiving member 30.

The overall deformation in this section A leads to a differential value $D_O$ of the tilt values N1 and N2, respectively, in the tilt detection planes E1 and E2 ascertained between the sensors S1 and S2 prior to the force SL, which corresponds to the bearing load, being applied to the coupling ball 44 deviating from the differential value $D_{sl}$ of the tilt values N1 and N2, respectively, after the force SL, which corresponds to the bearing load, has acted on the coupling ball 44.

This deviation between the differential values $D_O$ and $D_{sl}$ makes it possible to detect the deformation of the section A caused by the force SL which corresponds to the bearing load and this deformation is, in a first approximation, dependent on, preferably approximately proportional to the bearing load on the coupling ball 44.

The deviation of the differential value $D_{sl}$, which will be recorded after the force SL which corresponds to the bearing load has acted on the coupling ball 44, from the differential value $D_O$ which will be recorded prior to the force SL which corresponds to the bearing load acting on the coupling ball 44, for example within the scope of a reference measurement when the trailer coupling is brought into the operating position, can therefore be used by the evaluation unit 50 as a measure for the bearing load or the force SL and with suitable calibration the evaluation unit 50 can either display the value of the bearing load or the force SL itself and/or indicate whether the bearing load or the corresponding force SL is in a range of values tolerable for this motor vehicle 10 or outside a range of values tolerable for this motor vehicle 10.

For example, the evaluation unit 50 has a display unit 60 associated with it which indicates the value for the force SL corresponding to the bearing load in the form of a bar 62, wherein the bar 62 indicating the bearing load or the force SL extends parallel to a scale field 64 which differentiates either between a tolerable range and a non-tolerable range or between several graduated ranges of tolerability or, where applicable, even has a scale, on which the values for the bearing load SL can be read.

The sensors S1 and S2 can operate, in addition, as acceleration sensors and, for example, in the dynamic case, i.e. when the motor vehicle 10 is moving, detect accelerations caused by the forces Vo or Vu, Ql or Qr or Lv or Lr in part or as a whole, depending on the number of axes, in which accelerations can be detected, wherein either both sensors S1 and S2 experience the same accelerations or, where applicable, different accelerations, for example caused by deformations of the section A of the body connection support 26 which result, in addition.

For example, in the case of forces Vo or Vu which act dynamically the accelerations which are measured by the sensor S2 in these directions can be greater than the accelerations which are measured by the sensor S1 since the section A of the body connection support 26 can have, in these directions, a relatively great elasticity and, therefore, deformation whereas, for example, the transverse forces Ql or Qr generate essentially identical accelerations for the sensors S1 and S2 since, in these directions, the section A has less elasticity and, therefore, less deformation.

Also in the direction of the forces Lv and Lr, the accelerations which are measured with the sensor S2 can be greater than the acceleration measured with the sensor S1 since in these directions, as well, the section A has an elasticity which leads to a deformation of the body connection support 26 in the area of the section A.

Figure 6:
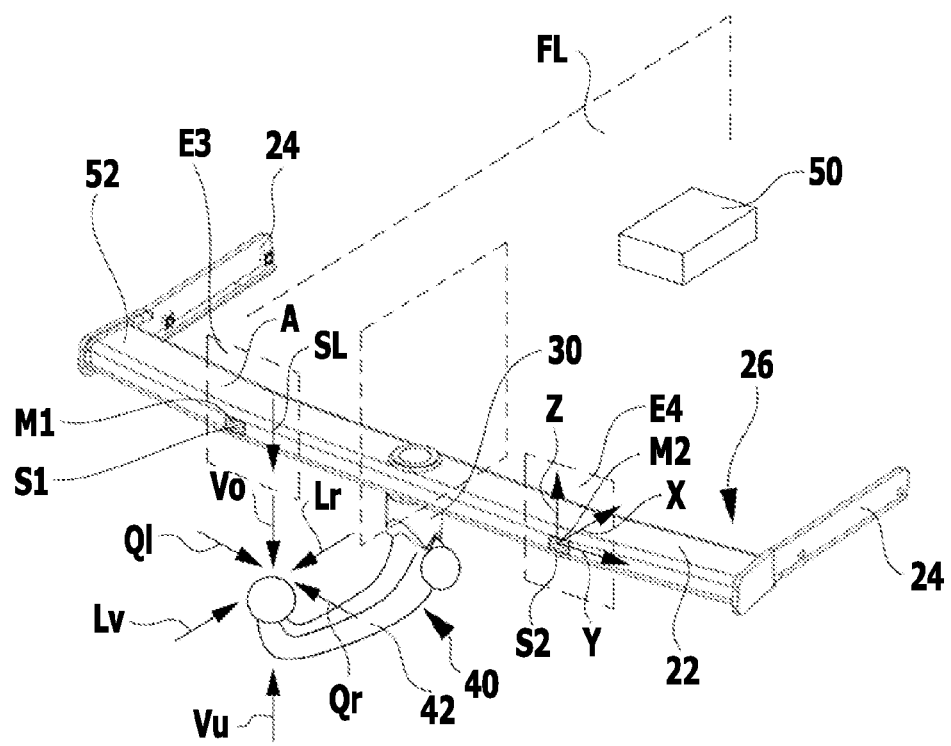
FIG. 6 shows a perspective illustration similar to FIG. 2 of a second embodiment of a carrier device according to the invention.

On account of the accelerations measured by the sensors S1 and S2, the forces corresponding to these accelerations can be determined by the evaluation unit 50 and transferred, for example, to a unit 70 which records a dynamic load on the carrier device 20 and, for example, plots this with respect to a time axis and/or averages it over a period of time and/or transmits it further to dynamic travel regulators of the motor vehicle in order to influence them. In contrast to the first embodiment, the sensors S1 and S2 in a second embodiment, illustrated in FIG. 6, are arranged at the same distances from the side members 24 and aligned such that they detect tilting about the X axis, i.e. in the YZ planes, and so the tilt detection planes E3 and E4 extend transversely, preferably at right angles, to the longitudinal central plane FL of the vehicle, wherein the Z direction at least forms the smallest angle with the vertical line V, is preferably aligned approximately parallel to the vertical line V.

With such an arrangement, the sensors S1 and S2 detect the deflection downwards of the section of the cross member 22 between the installation points M1 and M2 which occurs with the force SL on the ball head 44.

With increasing force SL, the tilting of the sensors S1 and S2 in the tilt detection planes E3 and E4 also increases.

With respect to the remaining features and evaluation of the signals of the sensors, reference is made in full to the comments on the preceding embodiments.

Figure 7:
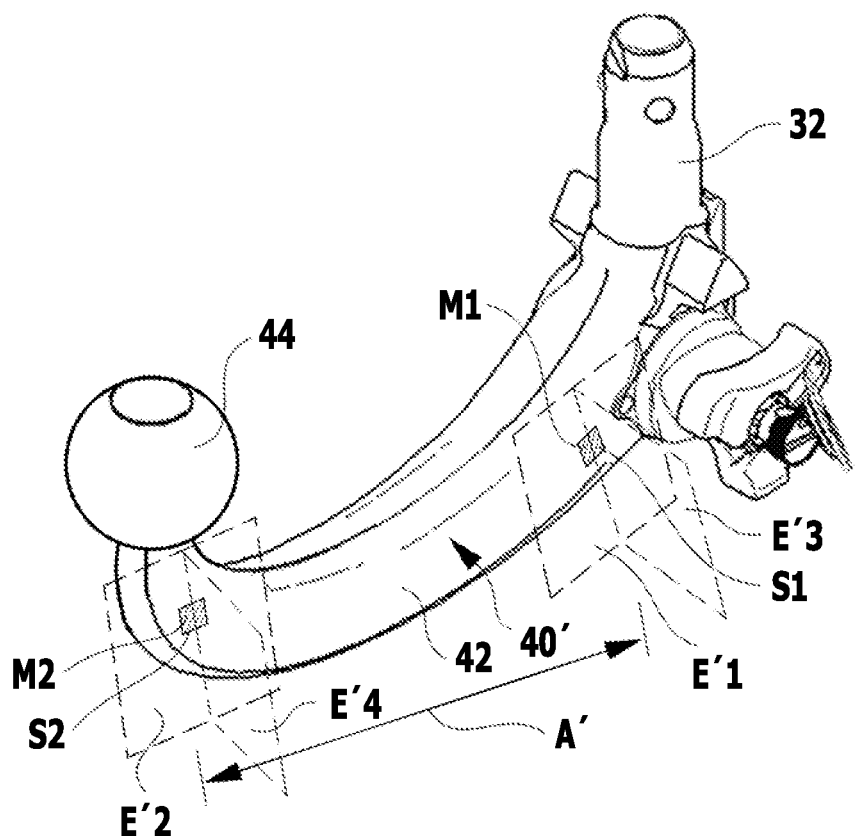
FIG. 7 shows a bearing load receiving element of a third embodiment of a carrier device according to the invention.

Alternatively or in addition to the first or second embodiments, it is provided in a third embodiment of a carrier device 20 according to the invention, of which only the bearing load receiving element 40' is illustrated in FIG. 7, for the sensors S1 and S2 to be arranged directly on the ball neck 42, wherein the sensor S1 is arranged close to the holding element 32 while the sensor S2 is arranged close to the coupling ball 44 so that a section A of the ball neck 42 is located between them.

Furthermore, the sensors S1 and S2 are arranged such that their tilt detection planes E'1 and E'2 extend essentially parallel to one another, wherein these tilt detection planes E'1 and E'2 can, for example, be the XZ planes of the two sensors S1 and S2.

The recording of the force SL corresponding to the bearing load takes place in the same way as that described in conjunction with the first embodiment, by way of the deviation of the differential value Dsl between the tilting detected by the sensors S1 and S2 in the tilt detection planes E'1 and E'2 from the differential value $D_O$ of the tilting detected by the sensors S1 and S2 in the tilt detection planes E'1 and E'2 in the non-loaded state.

The evaluation and transmission can be brought about in a similar manner, wherein the section A' of the ball neck 42 displays a different elastic behavior to that of the body connection support 26 and so the bearing load will be displayed taking a different type of calibration curve for the evaluation unit 50 into consideration.

In addition, it is, however, also possible in YZ planes of the sensors S1 and S2, which correspond to the tilt detection planes E'3 and E'4 extending at right angles to the tilt detection planes E'1 and E'2 in FIG. 6, to detect the tilting and, therefore, also the differences in the tilting in order to record, for example, any twisting of the section A' under the influence of static or dynamic forces Ql and Qr with the evaluation unit 50.

As for the rest, the parts not expressly mentioned in conjunction with the third embodiment are designed in the same way as the corresponding parts of the first embodiment and so reference can be made in full to the comments on the first embodiment with respect to the description thereof.

Figure 8:
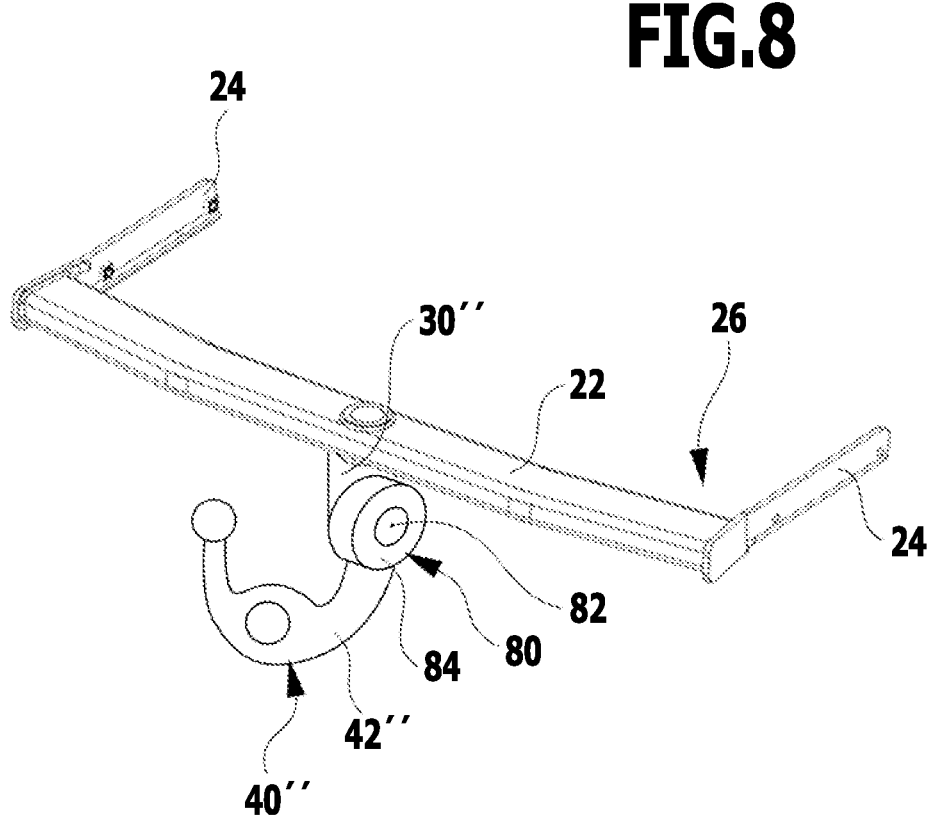
FIG. 8 shows a perspective illustration similar to FIG. 2 of a fourth embodiment of a carrier device according to the invention, designed as a trailer coupling with a movable ball neck.
Figure 9:
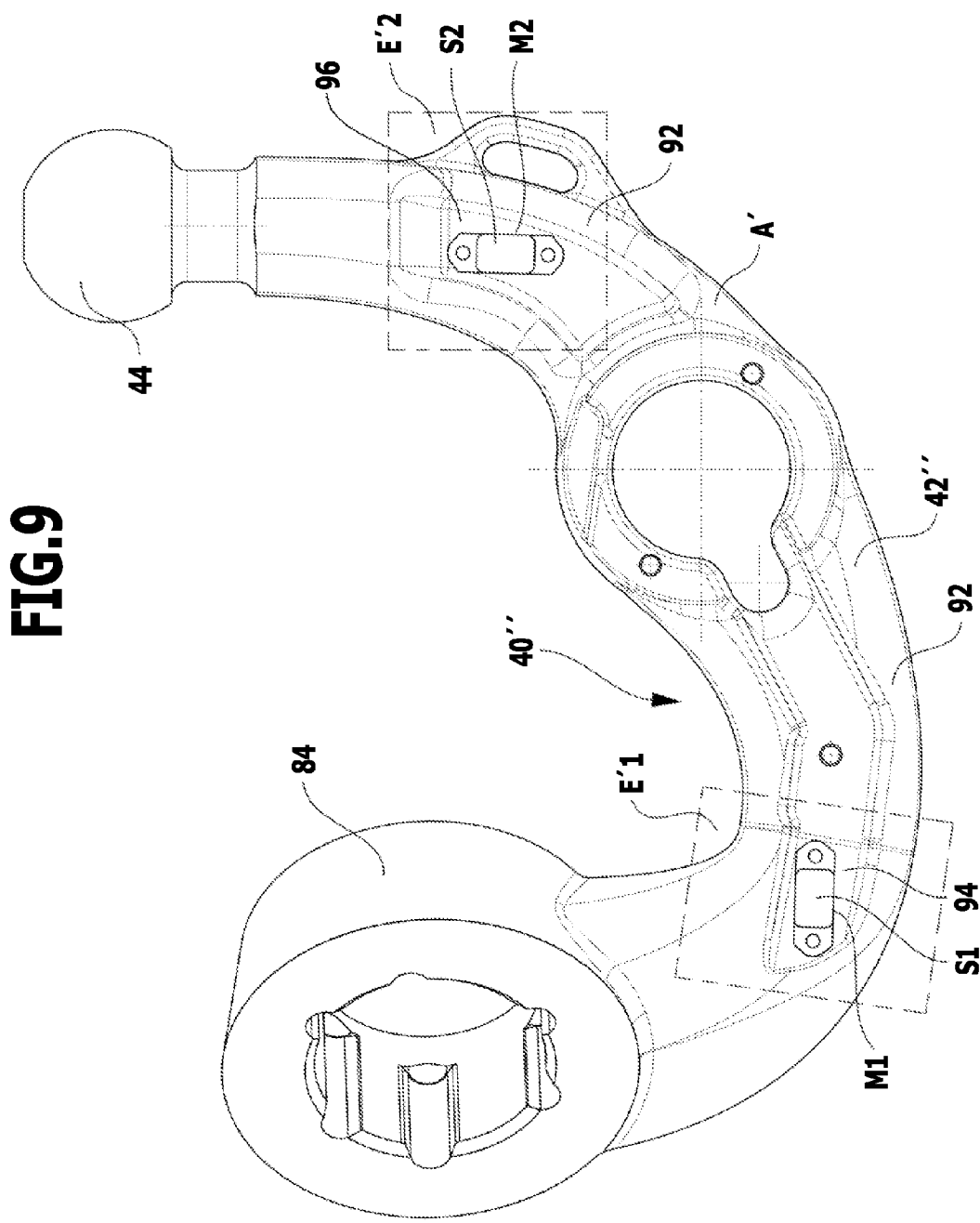
FIG. 9 shows an enlarged illustration of the bearing load receiving element in the third embodiment.

In a fourth embodiment, illustrated in FIG. 8, the body connection support 26 is designed in the same way as the first and second embodiments apart from the receiving member 30" and is also fixed in place on the rear area 14 of the vehicle body 12 of the motor vehicle 10 in the same way.

In contrast to the first embodiment, the receiving member 30' comprises a pivot bearing 80 for the bearing load receiving element 40", wherein the pivot bearing 80 has a bearing member 82 which is fixed in relation to the vehicle and a pivotable bearing member 84 is mounted so as to be movable relative to it, wherein the pivotable bearing member 84 can be designed, for example, so as to be pivotable about a single pivot axis, as described, for example, in the patent publications EP 0 799 732 A and EP 1 142 732 A, or can also be pivotable about multiple axes, in the extreme case three.

The pivot bearing 80 can, in addition, be locked to a locking device 90, which is not illustrated in detail and is preferably integrated into the pivot bearing 80, in at least one pivoting position in order to, for example in the working position illustrated in FIG. 8, fix the bearing load receiving element 40" in place as rigidly as possible relative to the body connection support 26 in a defined position.

In the fourth embodiment, as well, only the sensors S1 and S2 can be arranged on the body connection support 26, as described in conjunction with the first embodiment.

In addition or alternatively thereto, it is provided in the fourth embodiment for the sensors S1 and S2 to be arranged on the ball neck 42, namely likewise such that a section A" of the ball neck 42" extends between the sensors S1 and S2.

In this respect, the sensors S1 and S2 are preferably arranged in areas 94 and 96 which are recessed relative to a side contour 92 of the ball neck 42' so that the sensors S1 and S2 are protected against damage, as a result, on account of the side contour 92.

In the fourth embodiment, as well, the sensors S1 and s2 are arranged such that they are able to detect movements, in particular tilting in the tilt detection planes E'1 and E'2, in the same way as that described in conjunction with the third embodiment, wherein when a force SL corresponding to the bearing load acts on the coupling ball 44 this leads to a deformation of the section A" of the ball neck 42" which represents a measure for the force SL corresponding to the bearing load acting on the coupling ball 44 and is apparent in the deviation of a differential value Dsl of the tilting measured by the sensors S1 and S2 in the tilt detection planes E'1 and E'2 with action of the force SL from the differential value $D_O$ of the tilting measured by the sensors S1 and S2 in the tilt detection planes E'1 and E'2 without any bearing load.

Figure 10:
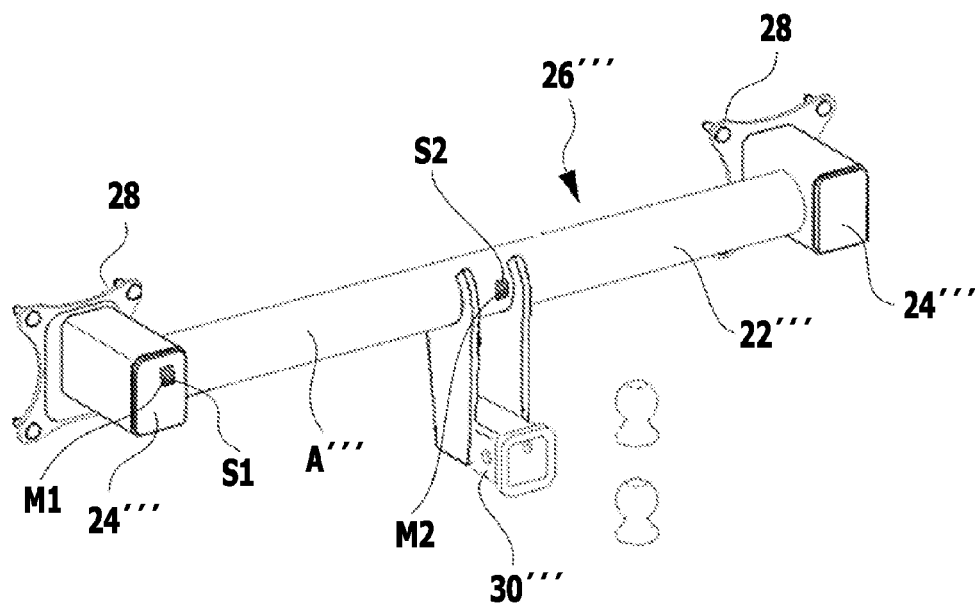
FIG. 10 shows a perspective illustration of a fifth embodiment of a carrier device according to the invention with illustration of the body connection support without the bearing load receiving element.

In a fifth embodiment of a carrier device according to the invention, illustrated in FIG. 10, a cross member 22''' is likewise provided in the case of the body connection support 26''' and this cross member is held between side members 24''', wherein the side members 24''' do not extend along holding walls of the rear area 14 of the body 12 but have assembly flanges 28 which can be screwed onto corresponding receiving members of the body 14.

In the fifth embodiment, the sensors S1 and S2 are arranged on the cross member 22''' in the same way as in the first embodiment and detect torsion in the section A''' of the cross member 22''' in the same way as that described in conjunction with the first embodiment.

Figure 11:
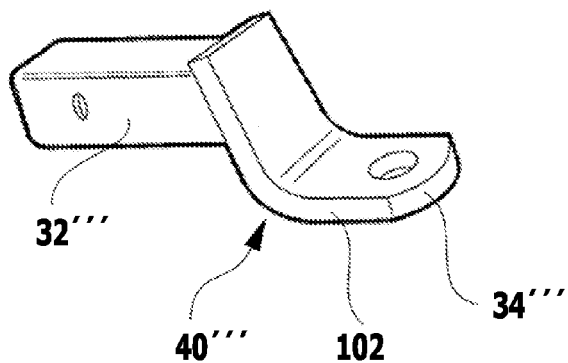
FIG. 11 shows a perspective illustration of the bearing load receiving element of the fifth embodiment of the carrier device according to the invention.

In contrast to the first embodiment, the receiving member 30'' is, however, designed as a receiving sleeve with a square receiving member, into which a holding element 32''', which is illustrated in FIG. 11 and designed, for example, as a square pipe, can be inserted and fixed in place, wherein the holding element 32''' is part of a bearing load receiving element which is designated as a whole as 40'' and has a bearing load support 102, at the end 34''' of which facing away from the holding element 32''' a coupling ball or another load receiving element can be mounted.

The bearing load acting on the end 34''' of the bearing load receiving element 40''' leads, in the same way as that described in conjunction with the first embodiment, to a deformation of the cross member 22''' in the region of its section A''' which can be detected by the sensors S1 and S2 on account of an ascertained varying tilting in the same way as that described in conjunction with the first embodiment.

Figure 12:
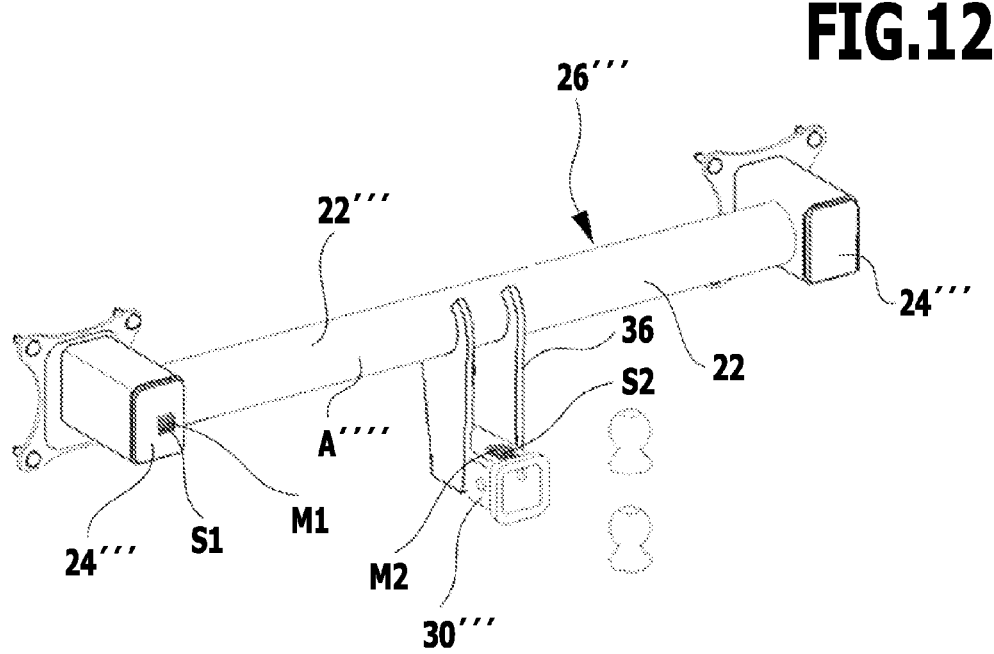
FIG. 12 shows a perspective illustration similar to FIG. 10 of a sixth embodiment of a carrier device according to the invention.

In a sixth embodiment of a carrier device 20 according to the invention, the body support connector 26''' of which is illustrated in FIG. 12, the second sensor S2 is not arranged on the cross member 22 but rather on the receiving member 30''' which is arranged at a distance from the cross member 22''' but connected rigidly to it by means of holding members 36 so that the section A'''' between the sensor S1 and the sensor S2 comprises part of the cross member 22''' as well as the holding members 36 which are deformed when acted upon by a force SL corresponding to the bearing load and, therefore, lead to different tilt differential values $D_{sl}$ and $D_O$ measured by the sensors S1 and S2 which can be evaluated in the same away as that described in conjunction with the first embodiment.

Figure 13:
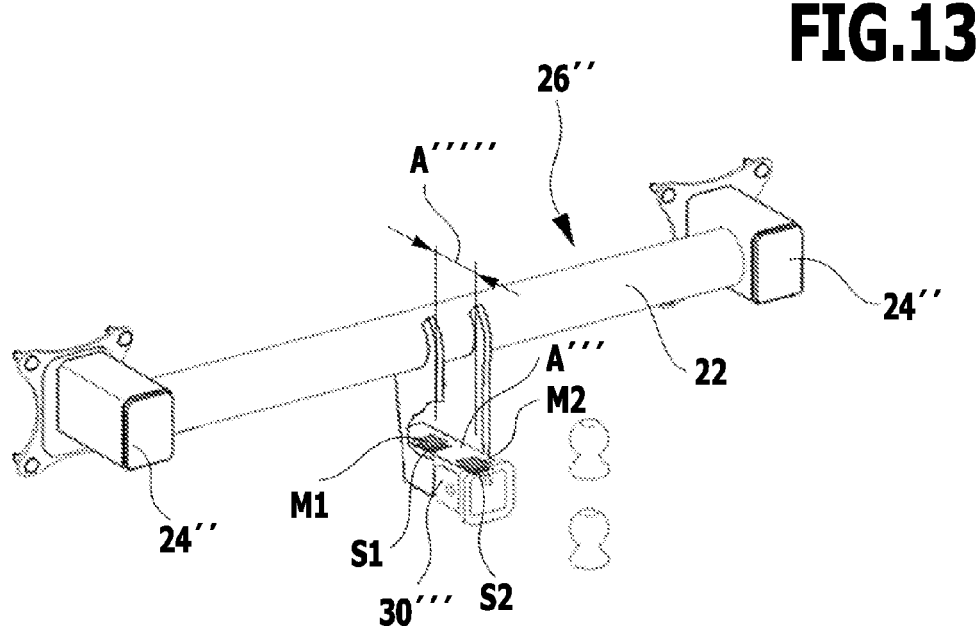
FIG. 13 shows a perspective illustration similar to FIG. 10 of a seventh embodiment of a carrier device according to the invention.

In a seventh embodiment of a carrier device according to the invention, illustrated in FIG. 13, the sensors S1 and S2 are arranged on the receiving member 30''' and therefore serve the purpose of detecting deformations of the receiving member 30''' on account of the action of the bearing load, wherein in this case the distance of the section A'''' is formed by the section of the receiving member 30''' extending between the sensors S1 and S2.

Figure 14:
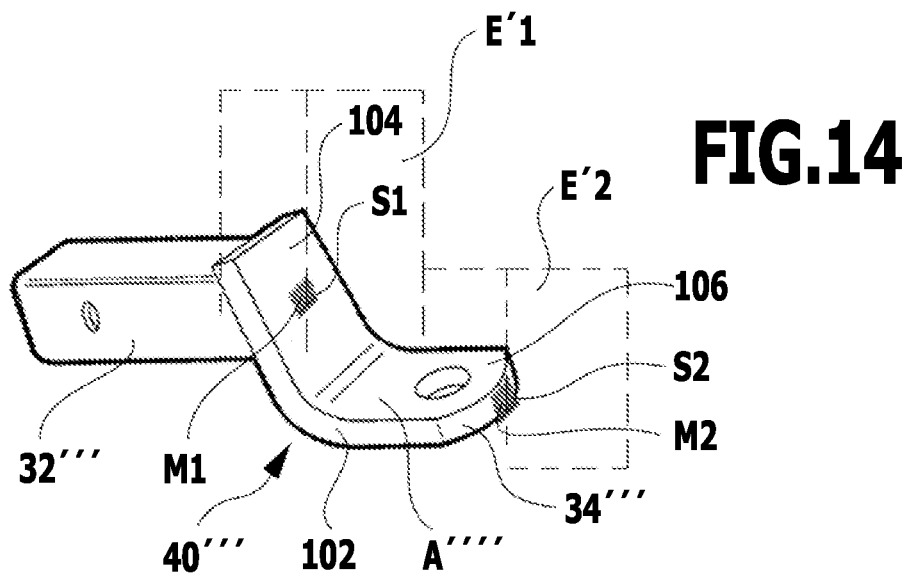
FIG. 14 shows a perspective illustration of a bearing load receiving element of an eighth embodiment of a carrier device according to the invention.

Alternatively to providing the sensors S1 and S2 on the respective body connection support 26''', as described in conjunction with the fifth, sixth and seventh embodiments, it is conceivable in an eighth embodiment, illustrated in FIG. 14, to provide the sensors S1 and S2 on the bearing load receiving element 40''', wherein the sensor S1 is arranged, for example, on an end 104 of a bearing load support 102 which adjoins the holding element 32''', the sensor S2 being arranged on the end 106 of the bearing load support located opposite the end 104.

Both sensors S1 and S2 at least detect movements in the tilt detection planes E'1 and E'2 which extend essentially parallel to the longitudinal central plane FL of the vehicle, wherein the evaluation of the sensor signals is brought about in the same way as that described in conjunction with the first and second embodiments.

Figure 15:
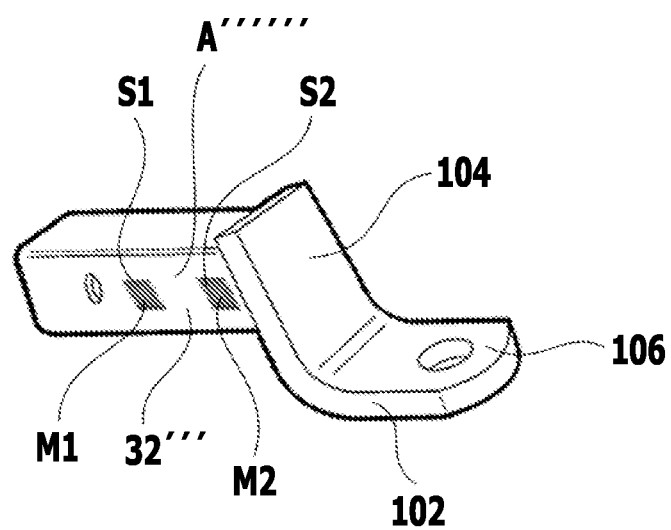
FIG. 15 shows an illustration of a bearing load receiving element of a ninth embodiment of a carrier device according to the invention.

Alternatively to providing the sensors S1 and S2 on the bearing load support 102, it is possible, as illustrated in FIG. 15 in conjunction with a ninth embodiment of the carrier device according to the invention, to arrange the sensors S1 and S2 on the holding element 32''' which can be inserted into the receiving member 30''', wherein, in this case, the sensors S1 and S2 detect deformations A''''' of the holding element 32''.

Figure 16:
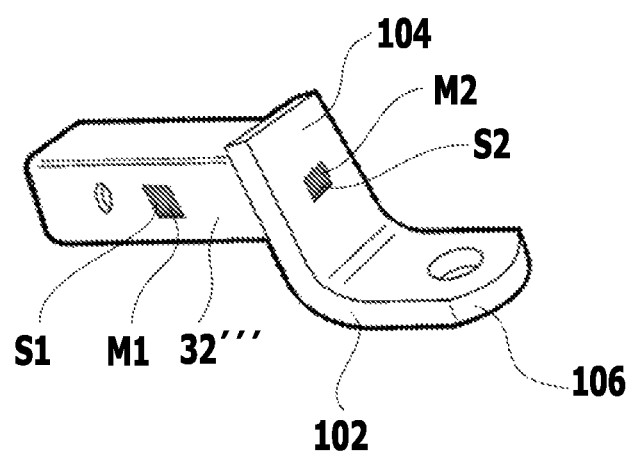
FIG. 16 shows an illustration similar to FIG. 14 of a bearing load receiving element of a tenth embodiment of a carrier device according to the invention.

In a tenth embodiment of a carrier device according to the invention, illustrated in FIG. 16, the sensors S1 and S2 are arranged, on the one hand, on the holding element 32''' and, on the other hand, on the end 104 of the bearing load support 102.

Figure 17:
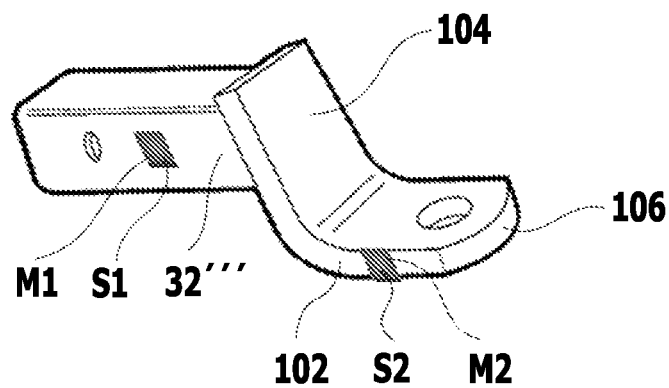
FIG. 17 shows a perspective illustration of a bearing load receiving element similar to FIG. 14 of an eleventh embodiment of a carrier device according to the invention and FIG. 18 shows a perspective illustration of a twelfth embodiment of a carrier device according to the invention.
Figure 18:
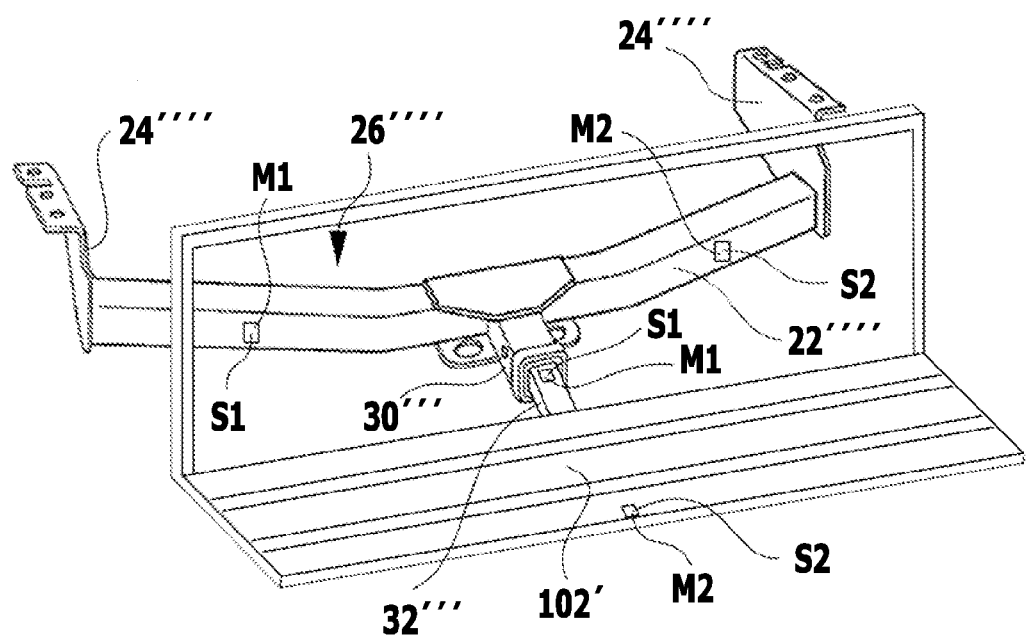

In an eleventh embodiment of a carrier device according to the invention, illustrated in FIG. 17, the sensors S1 and S2 are arranged, on the one hand, on the holding element 32''' and, on the other hand, close to the end 104 on the bearing load support 102. In a twelfth embodiment of a carrier device according to the invention, illustrated in FIG. 18, the bearing load support 102' connected to the holding element 32''' is designed as a rear load carrier, wherein the rear load carrier serves, for example, to accommodate bicycles and can be inserted into the receiving member 30''' with the holding element 32''' held on it in order to fix the rear load carrier 102'' in place on the body connection support 26'''', wherein the body connection support 26'''' has, for its part, a cross member 22'''' which, on the other hand, can be connected to the body of the motor vehicle by side members 24''''.

In this twelfth embodiment, the sensors S1 and S2 are arranged at the installation points M1 and M2 which correspond to the installation points of the second embodiment according to FIG. 6. It is, however, also conceivable to arrange the sensors S1 and S2 at all the points which have been explained in conjunction with the first and the fourth to tenth embodiments and to design the evaluation unit 50 accordingly.

As for the rest, reference is also made with respect to this embodiment to the comments on the corresponding parts of the preceding embodiments.

The invention claimed is:

1. A carrier device designed to support loads and configured for attachment to motor vehicles, wherein the carrier device is provided at least with a first sensor at a first installation point and with a second sensor at a second installation point, a section of the carrier device being located between the two installation points, the deformations of said section caused by a load being detected by the sensors at least in part and an evaluation unit being provided for recording measurement values of the sensors and determining a borne load from them; and wherein the first sensor and the second sensor are tilt sensors.

2. The carrier device as defined in claim 1, wherein the section of the carrier device is a one-piece section.

3. The carrier device as defined in claim 1, wherein the section of the carrier device comprises parts connected to one another by clearance-free connections.

4. The carrier device as defined in claim 3, wherein the clearance-free connections are materially joined connections.

5. The carrier device as defined in claim 1, wherein the deformations caused by a load are detected with respect to planes of detection of the sensors, said planes being essentially parallel to one another.

6. The carrier device as defined in claim 5, wherein the planes of detection extend essentially parallel to two directions of measurement of the sensors predetermined by a construction of the sensors.

7. The carrier device as defined in claim 1, wherein the evaluation unit forms differential values from the measurement values for determining the load.

8. The carrier device as defined in claim 7, wherein the evaluation unit compares load-free differential values with differential values caused by a load for determining the load.

9. The carrier device as defined in claim 8, wherein the evaluation unit determines a measurement for the load from the deviation of the differential values caused by a load from a load-free differential value.

10. The carrier device as defined in claim 1, wherein the evaluation unit determines a load-free tilt differential value within the scope of a reference value measurement.

11. The carrier device as defined in claim 1, wherein the evaluation unit determines a tilt differential value caused by a load when a vehicle is not moving.

12. The carrier device as defined in claim 1, wherein the evaluation unit evaluates the admissibility of the load by way of comparison with at least one reference value predetermined in the evaluation unit.

13. The carrier device as defined in claim 12, wherein the evaluation unit is coupled to a display unit displaying the admissibility of the load.

14. The carrier device of claim 1, wherein the evaluation unit records accelerations with at least one of the first and the second sensor.

15. The carrier device as defined in claim 14, wherein the evaluation unit records accelerations with both sensors.

16. The carrier device as defined in claim 14, wherein the evaluation unit records accelerations transverse to a longitudinal central plane of the vehicle.

17. The carrier device as defined in claim 14, wherein the evaluation unit records accelerations in the longitudinal central plane of the vehicle.

18. The carrier device as defined in claim 17, wherein the evaluation unit records accelerations in a horizontal direction.

19. The carrier device as defined in claim 17, wherein the evaluation unit records accelerations in a vertical direction.

20. The carrier device as defined in claim 1, wherein the carrier device comprises a body connection support arranged on a body at the rear end and a bearing load receiving element held by the body connection support.

21. The carrier device as defined in 20, wherein the first and the second installation points are arranged on the body connection support.

22. The carrier device as defined in claim 20, wherein the first and the second installation points are arranged on the bearing load receiving element.

23. A carrier device designed to support loads and configured for attachment to motor vehicles, wherein the carrier device is provided at least with a first sensor at a first installation point and with a second sensor at a second installation point, a section of the carrier device being located between the two installation points, the deformations of said section caused by a load being detected by the sensors at least in part and an evaluation unit being provided for recording measurement values of the sensors and determining a borne load from them; and wherein the first sensor and the second sensor are acceleration sensors operable as tilt sensors.

24. A carrier device designed to support loads and configured for attachment to motor vehicles, wherein the carrier device is provided at least with a first sensor at a first installation point and with a second sensor at a second installation point, a section of the carrier device being located between the two installation points, the deformations of said section caused by a load being detected by the sensors at least in part and an evaluation unit being provided for recording measurement values of the sensors and determining a borne load from them; and wherein the sensors detect tilting about at least one axis of inclination; and wherein the sensors detect tilt values with respect to a direction of gravity as reference.

25. A carrier device designed to support loads and configured for attachment to motor vehicles, wherein the carrier device is provided at least with a first sensor at a first installation point and with a second sensor at a second installation point, a section of the carrier device being located between the two installation points, the deformations of said section caused by a load being detected by the sensors at least in part and an evaluation unit being provided for recording measurement values of the sensors and determining a borne load from them; and wherein the deformations caused by a load are recorded by way of tilt differential values formed from tilt values as measurement values of the sensors.

26. A carrier device designed to support loads and configured for attachment to motor vehicles, wherein the carrier device is provided at least with a first sensor at a first installation point and with a second sensor at a second installation point, a section of the carrier device being located between the two installation points, the deformations of said section caused by a load being detected by the sensors at least in part and an evaluation unit being provided for recording measurement values of the sensors and determining a borne load from them; and wherein the evaluation unit determines a deviation of tilt differential values of the two sensors caused by a bearing load from a tilt differential value free from a bearing load.

27. The carrier device as defined in claim 26, wherein the evaluation unit records a difference in tilt between tilting of the first sensor about a first axis of inclination and tilting of the second sensor about a second axis of inclination, the axes of inclination extending essentially at right angles to the longitudinal central plane of the vehicle.

* * * * *